US007948946B2

(12) United States Patent
Suh

(10) Patent No.: US 7,948,946 B2
(45) Date of Patent: May 24, 2011

(54) METHOD FOR PROVIDING MULTICAST SERVICE ACCORDING TO HANDOFF OF SOURCE NODE IN MOBILE INTERNET PROTOCOL COMMUNICATION SYSTEM

(75) Inventor: Kyung-Joo Suh, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1596 days.

(21) Appl. No.: 11/270,264

(22) Filed: Nov. 9, 2005

(65) Prior Publication Data

US 2006/0120327 A1 Jun. 8, 2006

(30) Foreign Application Priority Data

Nov. 9, 2004 (KR) .................. 10-2004-0091118

(51) Int. Cl.
*H04W 4/00* (2009.01)
(52) U.S. Cl. .................. 370/331; 370/312; 455/436
(58) Field of Classification Search ................ 370/256, 370/312, 331; 455/436, 439, 442
See application file for complete search history.

(56) References Cited

U.S. PATENT DOCUMENTS

| 6,212,173 | B1 * | 4/2001 | Lindsay et al. ............... 370/331 |
| 2003/0095523 | A1 | 5/2003 | Korus et al. |
| 2004/0152417 | A1 * | 8/2004 | Kim et al. .................. 455/41.2 |
| 2004/0190542 | A1 | 9/2004 | Ono et al. |
| 2006/0035639 | A1 * | 2/2006 | Etemad et al. ............... 455/436 |

FOREIGN PATENT DOCUMENTS

| JP | 2001-177858 | 6/2001 |
| JP | 2003-258897 | 9/2003 |
| JP | 2004-214896 | 7/2004 |
| JP | 2004-304644 | 10/2004 |

OTHER PUBLICATIONS

Kyung Joo Suh et al.: "Fast Multicast Protocol for Mobile IPv6 in the Fast Handovers Environments", Jan. 1, 2004.
Rajeev Koodli: "Fast Handovers for Mobile IPv6", IETF Standard-Working-Draft, Internet Engineering Task Force, Oct. 25, 2004.
David B. Johnson et al.: "Mobility Support in IPv6 <Draft-IETF-MobileIP-IPv6-14.txt>", Jul. 2, 2000.
Gossain et al., "A Framework for Handling Multicast Source Movement over Mobile IP", May 2, 2002.

* cited by examiner

*Primary Examiner* — Ricky Ngo
*Assistant Examiner* — Kan Yuen
(74) *Attorney, Agent, or Firm* — The Farrell Law Firm, P.C.

(57) ABSTRACT

Disclosed is a method for providing a multicast service when an MN performs handoff from a first AR to a second AR in a mobile IP communication system including the first AR and second AR. The MN is a source node for providing the multicast service to a number of receivers and currently performs communication with the first AR. The second AR is different from the first AR. The method includes the steps of sending a request for information for fast handoff to the first AR at the MN, notifying the MN at the first AR whether the second AR can provide the multicast service in response to the fast handoff information request, notifying the first AR at the MN that the second AR must transmit subsequently-occurring multicast service data after the MN is notified whether the second AR can provide the multicast service, notifying the second AR of handoff initiation of the MN at the first AR when the MN is notified that the second AR must transmit subsequently-occurring multicast service data, notifying the first AR of handoff initiation notification acknowledgement at the second AR after the second AR is notified of the handoff initiation, and notifying the receivers at the first AR that the MN has performed handoff from the first AR to the second AR when the first AR is notified of the handoff initiation notification acknowledgement so that the receivers are controlled to rejoin a multicast tree to be provided with the multicast service.

27 Claims, 6 Drawing Sheets

METHOD FOR PROVIDING MULTICAST SERVICE ACCORDING TO HANDOFF OF SOURCE NODE IN MOBILE INTERNET PROTOCOL COMMUNICATION SYSTEM

PRIORITY

This application claims priority to an application entitled "Method for Providing Multicast Service According to Handoff of Source Node in Mobile Internet Protocol Communication System" filed with the Korean Intellectual Property Office on Nov. 9, 2004 and assigned Serial No. 2004-91118, the contents of which are incorporated herein by reference.

BACKGROUND OF THE INVENTION

1. Field of the Invention

The present invention relates to a communication system using a mobile Internet protocol (mobile IP) scheme (mobile IP communication system), and more particularly to a method for providing a multicast service according to handoff of a mobile node (MN) functioning as a source node.

2. Description of the Related Art

In general, when an MN hands off in using a mobile IP scheme, time delay caused by the handoff results in packet data loss. In an attempt to minimize such packet data loss, a fast handoff mode has been proposed, wherein time delay needed by an MN to perform handoff is minimized so that packet data loss is minimized accordingly.

In a multicast service scheme provided by a mobile IP communication system, packet data is multicast using an IP address reserved for a multicast service of packet data, i.e. a multicast service IP address. Particularly, when packet data is transmitted via a network in the multicast service scheme, a receiver receives the packet data only after referring to a destination IP address of the packet data and confirming that it is identical to a multicast service IP address of desired packet data. In the multicast service scheme, a transmitter (i.e. source node) can simultaneously transmit packet data to a number of receivers in a single process (i.e. it can multicast packet data). This avoids waste of network resources caused by repeated transmission of the same data packet.

When the multicast service scheme is used, paths must be established between a transmitter, which transmits packet data, and receivers, which receive the packet data, in a tree scheme. The tree scheme is generally classified into a source-based tree scheme and a shared tree scheme. When the source-based tree scheme is used to establish paths between the transmitter and receivers, optimal paths are maintained between them and time delay decreases. In contrast, when the shared tree scheme is used to establish paths between the transmitter and receivers, a single path is shared in a predetermined range from the transmitter to the receivers.

The above-mentioned fast handoff scheme is applied when MNs transmit/receive packet data using a conventional mobile IP scheme. When handoff is performed while an MN provides or is provided with a multicast service using the multicast service scheme, packet data loss due to time delay caused by the handoff occurs in the same manner as when MNs transmit/receive packet data using a conventional mobile IP scheme.

FIG. 1 briefly shows handoff operation of an MN, which provides a multicast service in a conventional IP communication system.

Prior to a description of FIG. 1, it is to be noted that various studies are currently in progress to minimize time needed by an MN to hand off, which provides a service in a conventional mobile IP scheme or fast mobile IP scheme, and resulting packet data loss. However, few studies have been conducted to minimize time needed by a multicast service-providing MN (source node) to hand off, and this results packet data loss.

Referring to FIG. 1, while performing communication with an access router (AR) 110 (AR#1) in its service region, an MN 100 for providing a multicast service (i.e. source node) hands off into a service region of another AR 120 (AR#2). As the MN 100 hands off from the AR 110 to the AR 120, receivers receiving the multicast service from the MN 100, particularly, receivers 150, 160, and 170 (R#1, R#2, and R#3) must newly construct a multicast tree on the MN 100 (i.e. source-based tree), because the source node providing the multicast service has handed off.

However, it takes a long time to reconstruct a source-based tree in current mobile IP communication systems, because little consideration is given regarding how to reconstruct a source-based tree when a multicast service-providing source node hands off. Particularly, when a source node performs handoff, a new AR, to which the source node has handed off, must recognize that the source node is a multicast service provider, but receivers cannot recognize the handoff of the source node. As a result, multicast service data, received during time delay caused by handoff and as the receivers join a new source-based tree following the handoff, is inevitably lost. Even when a fast handoff scheme is used to minimize time delay caused by handoff of the source node, the source node is still obliged to reconstruct a source-based tree, in order to provide a multicast service after performing the handoff. The resulting loss of multicast service data is inevitable.

In summary, time delay caused by handoff of a source node and reconstruction of a source-based tree result in loss of multicast service data and degrades the overall performance of mobile IP communication systems.

SUMMARY OF THE INVENTION

Accordingly, the present invention has been made to solve the above-mentioned problems occurring in the prior art, and an object of the present invention is to provide a method for providing a multicast service according to handoff of a source node in a mobile IP communication system.

Another object of the present invention is to provide a method for constructing a tree for providing a multicast service at high speed according to handoff of a source node in a mobile IP communication system.

In order to accomplish these objects, there is provided a method for providing a multicast service when an MN performs handoff from a first AR to a second AR in a mobile IP communication system including the first and second ARs, the MN being a source node for providing the multicast service to a number of receivers and currently performing communication with the first AR, the second AR being different from the first AR, the method including the steps of requesting information for fast handoff to the first AR by the MN; notifying the MN via the first AR if the second AR can provide the multicast service in response to the fast handoff information request; notifying the first AR via the MN that the second AR must transmit subsequently-occurring multicast service data after the MN is notified whether the second AR can provide the multicast service; notifying the second AR of handoff initiation of the MN via the first AR when the MN is notified that the second AR must transmit subsequently-occurring multicast service data; notifying the first AR of handoff initiation notification acknowledgement via the second AR after the second AR is notified of the handoff initiation; and notifying the receivers via the first AR that the MN has performed handoff from the first AR to the second AR when the first AR is notified of the handoff initiation notification acknowledgement so that the receivers are controlled to reconstruct a tree to be provided with the multicast service.

In accordance with another aspect of the present invention, there is provided a method for providing a multicast service when an MN performs handoff from a first AR to a second AR in a mobile IP communication system including the first and second ARs, the MN being a source node for providing the multicast service to a number of receivers and currently performing communication with the first AR, the second AR being different from the first AR, the method including the steps of requesting information for fast handoff to the first AR when recognizing that handoff from the first AR to the second AR is necessary; receiving notification of whether the second AR can provide the multicast service from the first AR after requesting the fast handoff information; notifying the first AR that the second AR must transmit subsequently-occurring multicast service data after receiving the notification of whether the second AR can provide the multicast service; notifying the first AR of transmission of the second AR via the second AR after notifying the first AR that the second AR must transmit subsequently-occurring multicast service data; and notifying the receivers via the first AR that the MN has performed handoff from the first AR to the second AR after notifying the first AR of transmission of the second AR by the second AR and transmitting the multicast service data to the receivers via the MN so that the receivers are controlled to receive the multicast service data via a new multicast tree re-joined by the receivers.

In accordance with another aspect of the present invention, there is provided a method for providing a multicast service when an MN performs handoff from a first AR to a second AR in a mobile IP communication system including the first and second ARs, the MN being a source node for providing the multicast service to a number of receivers and currently performing communication with the first AR, the second AR being different from the first AR, the method including the steps of requesting information for fast handoff to the first AR by the MN; notifying the MN via the first AR whether the second AR can provide the multicast service in response to the fast handoff information request; disconnecting the MN from the first AR and setting up connection of the MN to the second AR after the MN is notified if the second AR can provide the multicast service; notifying the second AR via the MN that the MN has been disconnected from the first AR and connected to the second AR together with information indicating that the second AR must transmit subsequently-occurring multicast service data to the first AR after setting up connection of the MN to the second AR; and notifying the receivers via the second AR that the MN has performed handoff from the first AR to the second AR after the second AR is notified that the MN has been connected to the second AR so that the receivers are controlled to reconstruct a tree to be provided with the multicast service.

In accordance with another aspect of the present invention, there is provided a method for providing a multicast service when an MN performs handoff from a first AR to a second AR in a mobile IP communication system including the first AR and second AR, the MN being a source node for providing the multicast service to a number of receivers and currently performing communication with the first AR, the second AR being different from the first AR, the method including the steps of requesting information for fast handoff to the first AR when recognizing that handoff from the first AR to the second AR is necessary; receiving notification of whether the second AR can provide the multicast service from the first AR after requesting the fast handoff information; performing disconnection from the first AR and setup of connection to the second AR after receiving notification of whether the second AR can provide the multicast service and notifying the second AR of disconnection from the first AR and completion of connection to the second AR together with information indicating that the second AR must transmit subsequently-occurring multicast service data to the first AR; and notifying the receivers via the second AR that the MN has performed handoff from the first AR to the second AR after notifying that the MN has been connected to the second AR and transmitting the multicast service data to the receivers by the MN so that the receivers are controlled to receive the multicast service data via a new multicast tree rejoined by the receivers.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. In the following description of the present invention, a detailed description of known functions and configurations incorporated herein is omitted to avoid making the subject matter of the present invention unclear.

The present invention proposes a method for providing a multicast service according to handoff of a source node in a mobile Internet protocol(IP) communication system. In the following description of the present invention, it is assumed that a mobile node(MN) acts as the source node.

More particularly, in order to minimize multicast service data loss caused by handoff of an MN, the present invention proposes a method for providing a multicast service including the following procedure: (1) an MN informs a serving access router(AR) or previous AR (PAR), to which it currently belongs, that it is now a multicast service provider; (2) when the MN performs handoff from the PAR to a target AR or new AR (NAR), the PAR informs the NAR that the MN is the multicast service provider; (3) after the NAR determines a new care-of address (NCoA) of the MN, the PAR or NAR provides receivers receiving the multicast service with handoff information of the MN in conformity with a preset handoff scheme of the mobile IP communication system, so that they can create a tree beforehand; and (4) upon performing handoff, the MN provides the receivers with a multicast service via the created tree.

It is assumed in the present invention that a tree is created using a source-based tree scheme and every AR constituting a mobile IP communication system supports multicast service routing for multicast service support. In addition, in order to support fast handoff of an MN and multicast service provision, every AR constituting the mobile IP communication system is assumed to be informed of neighboring ARs, as well as whether or not they provide a multicast service.

Figure 1:
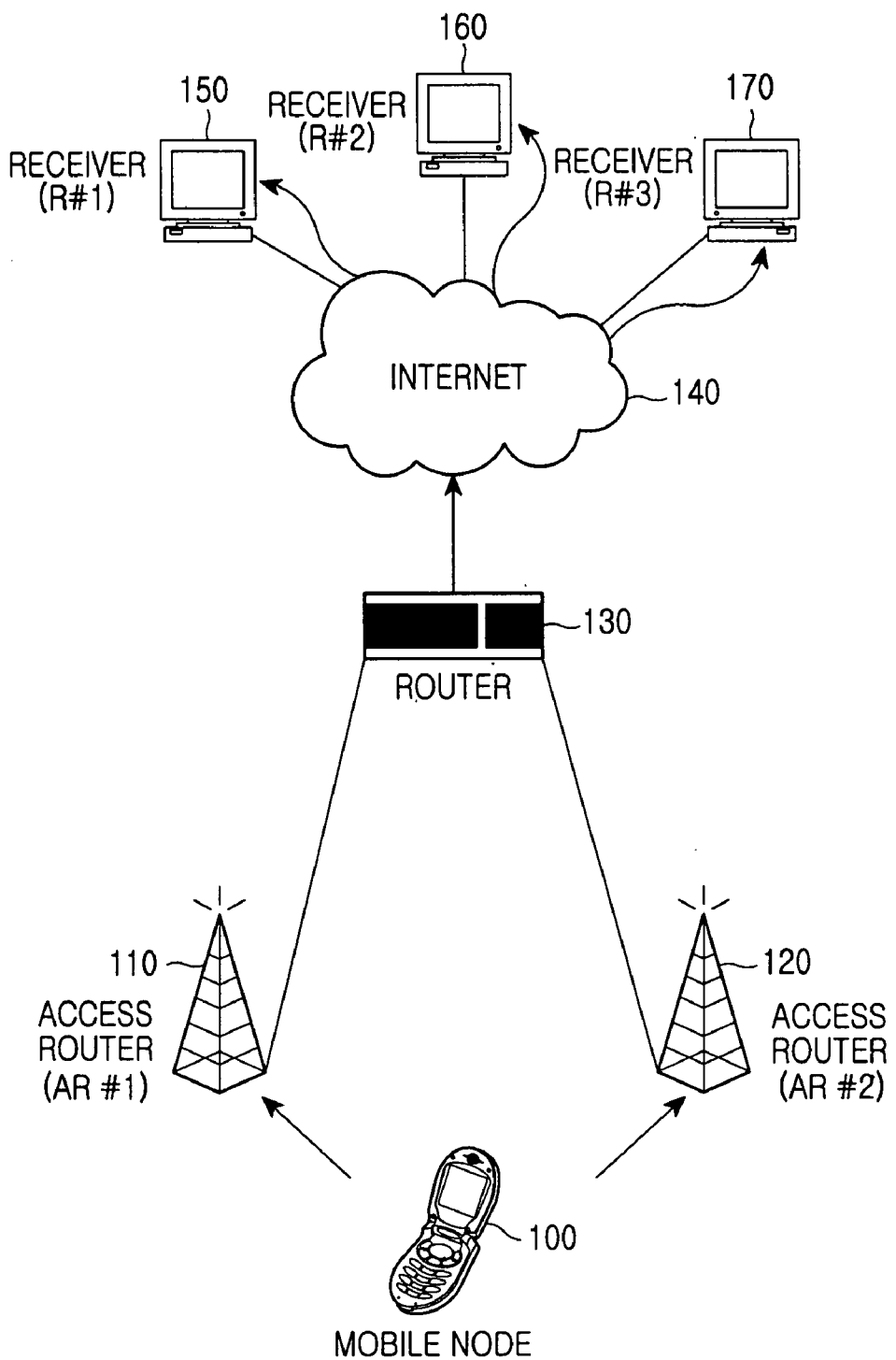
FIG. 1 briefly shows handoff operation of an MN, which provides a multicast service in a conventional mobile IP communication system.
Figure 2:
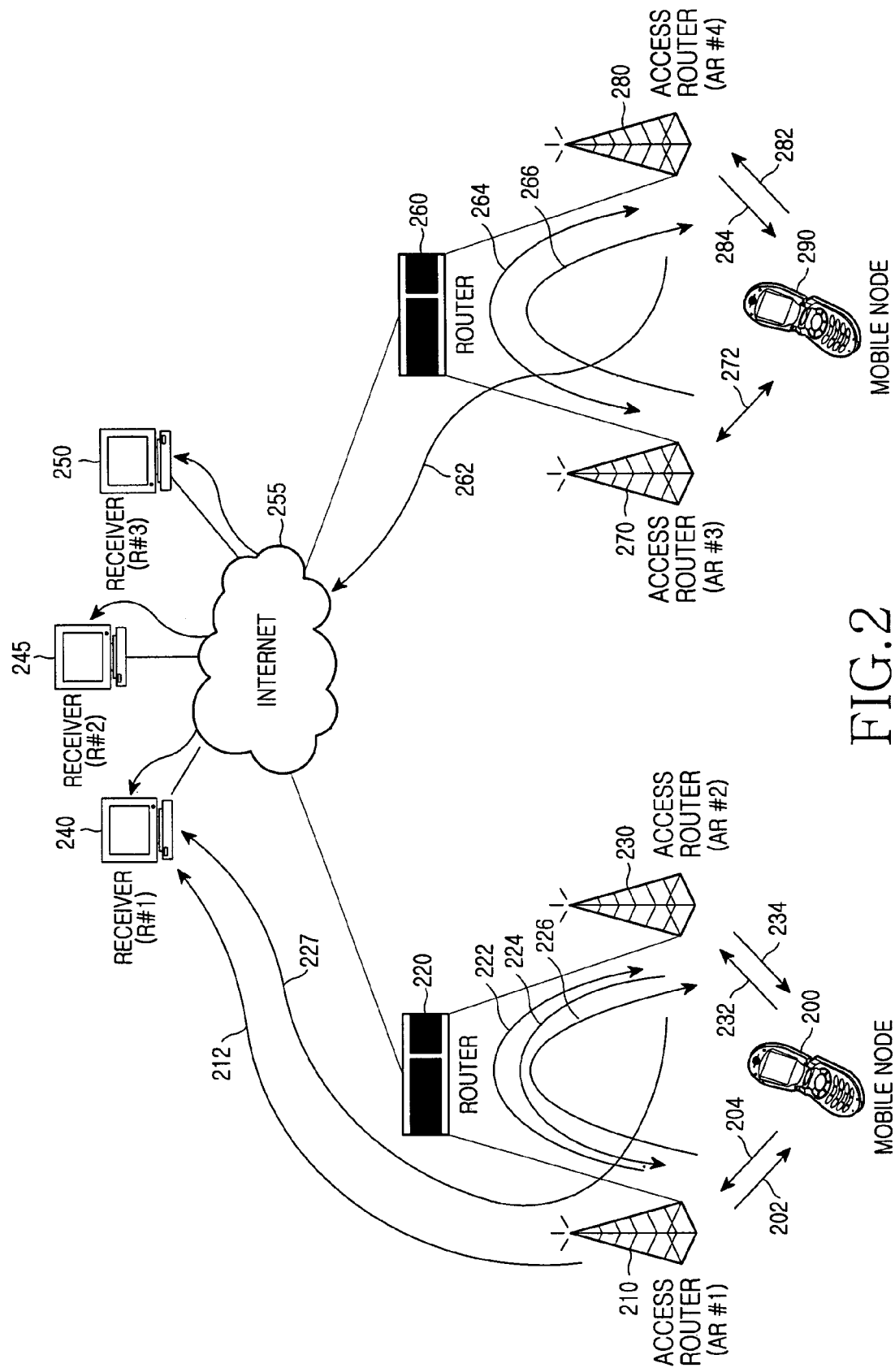
FIG. 2 briefly shows handoff operation of an MN, which provides a multicast service in a mobile IP communication system according to first and second embodiments of the present invention.

FIG. 2 briefly shows the handoff operation of an MN, which provides a multicast service in a mobile IP communication system according to first and second embodiments of the present invention.

Prior to descriptions with reference to FIG. 2, it is to be noted that the operation for providing a multicast service according to handoff of the MN varies depending on whether the handoff scheme used in the mobile IP communication system is a predictive fast handoff scheme or a reactive fast handoff scheme. In the first embodiment of the present invention, a method is proposed for providing a multicast service according to handoff of an MN when a predictive fast handoff scheme is used in a mobile IP communication system and, in the second embodiment of the present invention, a method is proposed for providing a multicast service according to handoff of an MN when a reactive fast handoff scheme is used in a mobile IP communication system. In addition, it is assumed that four AR's shown in FIG. 2, particularly, AR's 210, 230, 270, and 280 (AR#1, AR#2, AR#3, and AR#4) support IP version 6 (IPv6) schemes and handoff schemes, particularly a predictive fast handoff scheme and a reactive fast handoff scheme.

Operation for providing a multicast service according to handoff of an MN according to a first embodiment of the present invention will now be described.

As a source node, an MN 200 provides receivers with a multicast service in a service region of an AR 210 (PAR). When the MN 200 recognizes that it is to hand off from the AR 210 to an AR 230 (NAR) while providing the multicast service, it transmits/receives a router solicitation for proxy (RtSolPr) message and a proxy router advertisement (PrRtAdv) message to/from the AR 210 (step 202) to confirm whether or not the AR 230 provides the multicast service. The RtSolPr and PrRtAdv messages will be described later more specifically, and detailed description thereof will be omitted herein.

The MN 200 transmits a fast binding update (FBU) message to the AR 210—which includes information on whether or not the MN 200 provides a multicast service, is a host (i.e. source node) that provides the multicast service, and information on the multicast service provided by the MN 200 and initiates fast handoff (step 204). The FBU message will be described later more specifically, and detailed description thereof will be omitted herein for sake of clarity. After receiving the FBU message from the MN 200, the AR 210 adds the information on the multicast service, which is included in the FBU message, to a handoff initiation (HI) message and transmits it to the AR 230 (step 222). Upon receiving the HI message, the AR 230 transmits a handover acknowledgement (HACK) message to the AR 210 as an acknowledgement message to the HI message (step 224). The HI and HACK messages will be described later more specifically, and detailed description thereof will be omitted herein for sake of clarity.

When the AR 210 receives the HACK message from the AR 230, it notifies the receivers, which are provided with the multicast service from the MN 200, that the MN 200 is about to hand off from the AR 210 to the AR 230 (step 212). In contrast, when the MN 200 has already been disconnected from the AR 210, the AR 230 must notify the receivers, which are provided with the multicast service from the MN 200, that the MN 200 has handed off from the AR 210 to the AR 230 (step 227). This step will be described later more specifically, and detailed description thereof will be omitted. The MN 200 transmits multicast service data after the AR 210 or 230 notifies the receivers, which are provided with the multicast service from the MN 200, that the MN 200 has handed off from the AR 210 to the AR 230, and the multicast service data is delivered to the receivers via a tree.

After handing off, the MN 200 transmits a fast neighbor advertisement (FNA) message to the AR 230 and notifies that the MN 200 is connected to the AR 230 (step 232). Upon receiving the FNA message, the AR 230 delivers normal data, which is forwarded from the AR 210, to the MN 200 (step 234). As used herein, the normal data may be any type of data except multicast service data. In the case of step 234, the MN 200 acts as a normal receiver, not as a source node for providing a multicast service.

Operation for providing a multicast service according to handoff of an MN according to a second embodiment of the present invention will now be described.

As a source node, an MN 290 provides receivers with a multicast service in a service region of an AR 270 (PAR). When the MN 290 recognizes that it is to hand off from the AR 270 to an AR 280 (NAR) while providing the multicast service, it transmits/receives RtSolPr and PrRtAdv messages to/from the AR 270 (step 272) to confirm whether or not the AR 280 provides the multicast service.

As the MN 290 performs handoff, it transmits a FNA message, which is created by encapsulating the FBU message, to the AR 280 (step 282). By receiving the FNA message, the AR 280 can obtain information on the receivers, which are provided with the multicast service from the MN 290. Thereafter, the AR 280 notifies the receivers via the AR 270 that the MN 290 has handed off from the AR 270 to the AR 280 (step 262). The MN 270 transmits multicast service data after the AR 280 notifies the receivers that the MN 290 has handed off from the AR 270 to the AR 280.

The AR 280 transmits/receives the FBU message and a fast binding acknowledgement message to/from the AR 270 and sets up a tunnel (step 264). The AR 270 delivers normal data for the MN 290 to the AR 280 via the tunnel (step 266). The AR 280 delivers the normal data, which is forwarded from the AR 270, to the MN 290 (step 284). In the case of step 284, the MN 290 acts as a normal receiver, not as a source node for providing a multicast service.

The handoff operation of an MN, which provides a multicast service in a mobile IP communication system according to first and second embodiments of the present invention, has been described with reference to FIG. 2.

Figure 3:
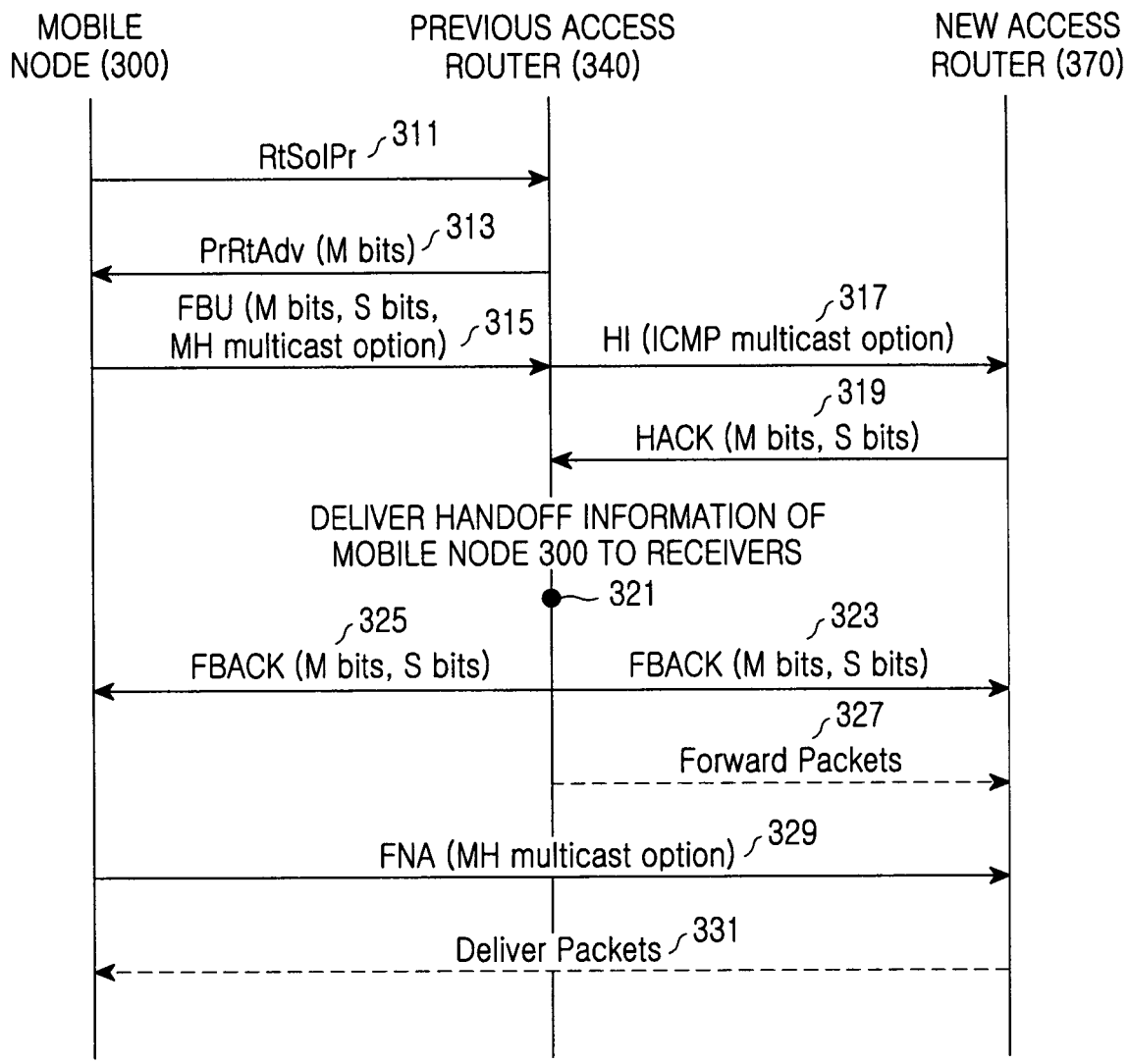
FIG. 3 shows the flow of signals in a process for providing a multicast service according to handoff of an MN, which provides a multicast service in a mobile IP communication system according to a first embodiment of the present invention.

FIG. 3 shows the flow of signals in a process for providing a multicast service according to handoff of an MN, which provides a multicast service in a mobile IP communication system according to a first embodiment of the present invention (i.e. which uses a predictive fast handoff scheme).

Referring to FIG. 3, an MN 300, which is a source node for providing a multicast service, transmits an RtSolPr message, which solicits information for fast handoff, to a PAR 340 (step 311). Upon receiving the RtSolPr message from the MN 300, the PAR 340 transmits a PrRtAdv message including information on an NAR 370, to which the MN 300 is about to hand off, (i.e. information on whether the NAR 370 provides the multicast service) to the MN 300 (step 313). The PrRtAdv message has a format as shown in the following Table 1. The PrRtAdv message is realized as a header of Internet control message protocol version 6 (ICMPv6) fields.

TABLE 1

| Type (8) | Code (8): 0 | | Checksum (16) |
|---|---|---|---|
| Subtype (8) | M | Reserved (7) | Identifier (16): copied from RtSolPr |

In Table 1, the number in parentheses in each field refers to the number of bits constituting the field, the "Type" field indicates the mobility protocol type of the currently-transmitted message, and the "Code" field has any of the following meanings, based on the value (1-4) given to it:

1: the currently-transmitted PrRtAdv message is an unsolicited message (i.e. it has not been solicited by the MN);

2: the currently-transmitted PrRtAdv message includes no information on the NAR;

3: the currently-transmitted PrRtAdv message includes information on the NAR, but the information is limited so as to pertain only to the subset of an access point (AP) solicited by the MN; and 4: the currently-transmitted PrRtAdv message includes information on the subset of an AP, however, which is not a handoff trigger.

In addition, the "Checksum" field indicates the checksum of the PrRtAdv and the "Subtype" field indicates the subtype of the currently-transmitted PrRtAdv. The "M" field in Table 1, which is newly proposed by the present invention, indicates whether or not the NAR provides the multicast service. When the "M" field is given "1", for example, it means that the NAR can provide the multicast service and, when given "0", it means that the NAR cannot provide the multicast service. The "Reserved" field is reserved for future use and the "Identifier" field indicates the same identifier as included in the RtSolPr.

After receiving the PrRtAdv message from the PAR 340, the MN 300 analyzes the M field included in the PrPtAdv message so that it can recognize whether or not the NAR 370 can provide the multicast service. When it is confirmed that the NAR 370 can provide the multicast service, the MN 300 adds the multicast service IP address of the multicast service to the FBU message and transmits it to the PAR 340.

The FBU message is used by the MN 300 to inform the PAR 340 that traffic, i.e. data, must be redirected to the NAR 370. Particularly, the FBU message authorizes the PAR 340 to bind the previous care-of address (PCoA) and NCoA of the MN 300 so that the data can tunnel into the region, to which the MN 300 has handed off.

The FBU message has a format as shown in following Table 2 and is realized as a mobility header in IP fields.

TABLE 2

| Payload Proto (8) | | | | Header len (8) | | MH type (8): 8 | Reserved (8) |
|---|---|---|---|---|---|---|---|
| | | Checksum (16) | | | | Sequence (16) | |
| A | H | L | K | M | S | Reserved (10) | Lifetime (16) |

In Table 2, the number in parentheses in each field refers to the number of bits constituting the field; the "Payload Proto" field indicates the type of an IPv6 header connected after the mobility header; the "Header len" field indicates the length of the FBU message in 8 octet unit, excluding the first 8 octets; the "MH" field is used to identify a mobility message; the "Checksum" field indicates the checksum of the FBU message; and the "Sequence" field indicates a sequence used by a receiver to sequence a binding update (BU) message, as well as by the source node to confirm that a binding acknowledgement (BA) message corresponds to the BU message.

In Table 2, the "A (acknowledgement)" field indicates whether or not the MN solicits a BA message from the receiver; the "H (home registration)" field indicates whether or not it is solicited that the receiver functions as a home agent (HA) of the MN; the "L (link-local address compatibility)" field indicates whether or not the home address of the MN has the same interface as the link-local address of the MN; and the "K (key management mobility capability)" field indicates whether or not a manual IPsec configuration is used.

The "M" field, which is newly proposed by the present invention, indicates whether or not the MN provides the multicast service and the "S" field, which is also newly proposed by the present invention, indicates that the MN is a host for providing the multicast service (i.e. the source node). When the "M" field is given "1", for example, it means that multicast service information, such as multicast service option of the FBU message (described later with reference to Table 3) is included. As used herein, the multicast service information refers to multicast service IP address of the multicast service provided by the MN. The "M" and "S" fields are used to construct a tree in such a manner that the MN acts as a source and the multicast service IP address acts as a receiver. The "Reserved" field is reserved for future use. The "Lifetime" field indicates the number of remaining time units before binding expires, and an example of time unit setting may be 4 seconds.

When the M bit of the FBU message has been set, i.e. when the "M" field of the FBU message is given "1", multicast service information must be included, and a multicast service option including such information has a format as shown in following Table 3. This multicast service option is realized as an option of mobility header similar to mobility option of mobility header.

TABLE 3

| Type (8) | Length (8) | Number (8) | Reserved (8) |
|---|---|---|---|
| | Multicast Address 1 (128) | | |
| | Multicast Address 2 (128) | | |

Prior to descriptions with reference to Table 3, it is to be noted that the MN can provide a number of multicast services and the multicast service option of the FBU message, as shown in Table 3, includes multicast service information on each of the multicast services. The multicast service option of the FBU message is newly proposed by the present invention. In Table 3, the number in parentheses in each field refers to the number of bits constituting the field; the "Type" field indicates the type of the multicast service option of the FBU message; the "L" field indicates the length of the multicast service option of the FBU message; the "Number" field indicates the number of multicast service IP addresses included in the multicast service option of the FBU message; the "Reserved" field is reserved for future use; and the "Multicast Address" fields indicate an actual multicast service IP address. It is assumed in Table 3 that the multicast service option of the FBU message includes two multicast service IP addresses.

After receiving the FBU message from the MN 300, the PAR 340 transmits an HI message, which indicates handoff initiation of the MN 300, to the NAR 370 (step 317). The PAR 340 adds the multicast service option included in the FBU message to the ICMPv6 multicast service option of the HI message, so that the MN 300 can notify the NAR 370 that the MN 300 is the source node providing the multicast service. The multicast service option of the HI message has a format as shown in following Table 4. This option is located in ICMPv6 fields.

TABLE 4

| Type (8) | Length (8) | Sub-Type (8) | Number (8) |
|---|---|---|---|
| S | | Reserved (127) | |
| | | Multicast Address (128) | |
| | | Multicast Address (128) | |

In Table 4, the number in parentheses in each field refers to the number of bits constituting the field; the "Type" field indicates the type of the multicast service option of the HI message; the "Length" field indicates the length of the multicast service option of the HI message; the "Sub-Type" field indicates the subtype of the multicast service option of the HI message and, for example, is given "0"; the "Number" field indicates the number of multicast service IP addresses included in the multicast service option of the HI message; the "S" field, which is newly proposed by the present invention, indicates whether or not the MN is the source node of the multicast service; the "Reserved" field is reserved for future use; and the "Multicast Address" fields indicate an actual multicast service IP address. It is assumed in Table 4 that the multicast service option of the ICMPv6 header of the HI message includes two multicast service IP addresses. The multicast service IP addresses included in the multicast service option of the HI message are identical to the multicast service IP addresses included in the multicast service option of the FBU message.

After receiving the HI message from the PAR 340, the NAR 370 transmits an Hack message, which is an acknowledgement message to the HI message, to the PAR 340 (step 319). The HACK message includes information on whether or not an expectation NCoA, which is created by the MN 300, can be used in its current state, and information on whether or not the NAR 370 can provide the multicast service, which is currently provided by the MN 300. The HAck message has a format as shown in following Table 5. This option is located in ICMPvt6 fields.

TABLE 5

| Type (8) | | Code (8) | | Checksum (8) |
|---|---|---|---|---|
| Subtype (8) | S | M | Reserved (6) | Identifier (16) |

In Table 5, the number in parentheses in each field refers to the number of bits constituting the field, the "Type" field indicates an experimental mobility protocol type of the HAck message, and the "Code" field has any of the following meanings, based on the value given to it:

0: handoff is accepted, and the expectation NCoA created by the MN is valid;

1: handoff is accepted, but the expectation NCoA created by the MN is invalid;

2: handoff is accepted, but the NCoA created by the MN has already been allocated to another MN;

3: handoff is accepted, and the NCoA created by the MN is allocated to the MN;

4: handoff is accepted, but the expectation NCoA created by the MN is not allocated to the MN;

5: handoff is rejected for unclear reasons;

128: handoff is rejected by an administrator (i.e. administratively prohibited); and 130: insufficient resources.

In Table 5, the "Checksum" field indicates the checksum of the HAck message; the "Subtype" field indicates the subtype of the HAck message and is given "5"; the "M" field, which is newly proposed by the present invention, indicates whether or not the NAR can provide the multicast service currently provided by the MN, i.e. a multicast service corresponding to the multicast service IP address included in the HI message received from the PAR; the "S" field, which is also newly proposed by the present invention, indicates whether or not the MN is the source node that provides the multicast service; the "Reserved" field is reserved for future use; and the "Identifier" field indicates the same identifier as the message identifier included in the HI message.

Although the HI message includes all necessary information on multicast services which the MN 300 is expected to provided, as mentioned with reference to Table 4, the HACK message solely informs via the "M" field whether or not the MN 300 can provide a desired multicast service, as mentioned with reference to Table 5. Thus, when the NAR 370 can provide only a part of the multicast services which the MN 300 is expected to provide, the PAR 340 cannot be fully notified of this situation with the "M" field. Therefore, the HAck message in Table 5 can be modified to indicate whether or not each multicast service, which corresponds to multicast service information included in the HAck message, can be provided. This can be realized in one of the two following schemes:

In a first scheme, the "Reserved" field in Table 5 is used to enlarge the "M" field in such a manner that it can accommodate the same number of bits as the number of multicast services delivered via the HI message. For example, when the HI messages include information on a total of 5 multicast services, 5 "M" fields are created. It is to be noted that, since the number of bits which the "Reserved" field can accommodate is limited, the number of the "M" fields can increase up to no more than the number of bits that the "Reserved" field can accommodate.

In a second scheme, the same multicast service option is added to the HAck message as in the case of the HI message. When this scheme is used, the NAR 370 can inform whether or not it can provide each multicast service, which corresponds to the multicast service information included in the HI message. Alternatively, the NAR 370 can solely inform which multicast service the MN 300 can provide.

After receiving the HAck message from the NAR 370, the PAR 340 notifies receivers, which are provided with the multicast service from the MN 300, that the MN 300 has handed off from the PAR 340 to the NAR 370 (step 321). The PAR 340 notifies the receivers of the handoff of the MN 300 using its own IP address as a source IP address, the multicast service IP address (i.e. receiver address) as a destination address and the NCoA of the MN 300 as delivery information. The receivers recognize the handoff of the MN 300 and minimize time delay so that multicast service data loss can be minimized. Particularly, the MN 300 transmits multicast service data after the PAR 340 notifies the receivers, which are provided with the multicast service from the MN 300, that the MN 300 has handed off from the PAR 340 to the PAR 370, and the multicast service data is delivered to the receivers via a tree.

The PAR 340 transmits a fast binding acknowledgement (FBack) message, which is an acknowledgement message to the FBU message, to the MN 300 and the NAR (steps 323 and 325). The FBack message has a format as shown in following Table 6 and is realized as a mobility header.

TABLE 6

| Payload Proto (8) | Header len (8) | MH type (8): 8 | | | Reserved (8) | |
| Checksum (16) | | Status (8) | K | S | M | Reserved (6) |
| Sequence Number (16) | | | Lifetime (16) | | | |

In Table 6, the number in parentheses in each field refers to the number of bits constituting the field; the "Payload Proto" field indicates the type of an IPv6 header connected after the mobility header of the FBACK message; the "Header len" field indicates the length of the FBACK message in 8 octet unit, excluding the first 8 octets; the "MH Type" field indicates a value used to identify a mobility message (i.e. FBack message); the "Checksum" field indicates the checksum of the FBack message; The "Reserved" fields are reserved for future use; and the "Status" field indicates whether or not disposition of FBU has occurred.

The "K (key management mobility capability)" field indicates whether a manual IPsec configuration is used; the "M" field, which is newly proposed by the present invention, indicates whether or not the MN provides the multicast service, as described with reference to Table 2; the "S" field, which is also newly proposed by the present invention, indicates that the MN is the host which provides the multicast service (i.e. source node); the "Sequence Number" field indicates a sequence number for confirming that the FBack message corresponds to the FBU message; and the "Lifetime" field indicates the number of remaining time units before the FBack message expires, so that receivers of the FBACK message have binding information for traffic redirection.

Although not separately shown in FIG. 3, when the MN 300 has already been disconnected from the PAR 340, the NAR 370 must notify the receivers of the handoff of the MN 300. In this case, the NAR 370 transmits packet data using the PCoA of the MN 300 as a source IP address, the multicast service IP address as a reception address, and the NCoA of the MN 300 as data. Particularly, the packet data, namely information about NCoA of the MN is encapsulated and transmitted to the PAR 340 using the NAR 370 as a transmitter and the PAR 340 as a receiver. Upon receiving the packet data, namely information about NCoA of the MN, from the NAR 370, the PAR 340 de-encapsulates it and transmits the NCoA information of the MN 300 to final receivers, i.e. receivers which are provided with the multicast service from the MN 300.

After receiving the FBack message from the PAR 340, the MN 300 is disconnected from the PAR 340, which transmits normal data received from the MN 300 to the NAR 370 (step 327). In this case, the MN 300 functions as a normal receiver, not a source node which provides a multicast service.

The MN 300 transmits an FNA message to the NAR 370 (step 329). This is for the purpose of informing that the MN 300 has received the FBack message from the PAR 340 to confirm an NCoA and has been connected to the NAR 370. The MN 300 transmits a mobility header multicast service option of the FNA message to notify that the MN 300, which is a source node for providing a multicast service, has been connected to the NAR 340. The mobility header multicast service option of the FNA message is given in the following Table 7.

TABLE 7

| Type (8): TBA | Length (8) | Number (8) | Reserved (8) |
| | Multicast Address (128) | | |
| | Multicast Address (128) | | |

The multicast service option of the FNA message is newly proposed by the present invention. In Table 7, the number in parentheses in each field refers to the number of bits constituting the field; the "Type" field indicates the type of the multicast service option of the FNA message; the "Length" field indicates the length of the multicast service option of the FNA message; the "Number" field indicates the number of multicast service IP addresses included in the multicast service option of the FNA message; the "Reserved" field is reserved for future use; and the "Multicast Address" fields indicate an actual multicast service IP address.

After receiving the FNA message from the MN 300, the NAR 370 transmits normal data, which is received from the PAR 340, to the MN 300 (step 331). In this case, the MN 300 functions as a normal receiver, not a source node for providing a multicast service.

The operation for providing a multicast service according to handoff of an MN, which provides a multicast service in a mobile IP communication system according to the first embodiment of the present invention, has been described with reference to FIG. 3.

Figure 4:
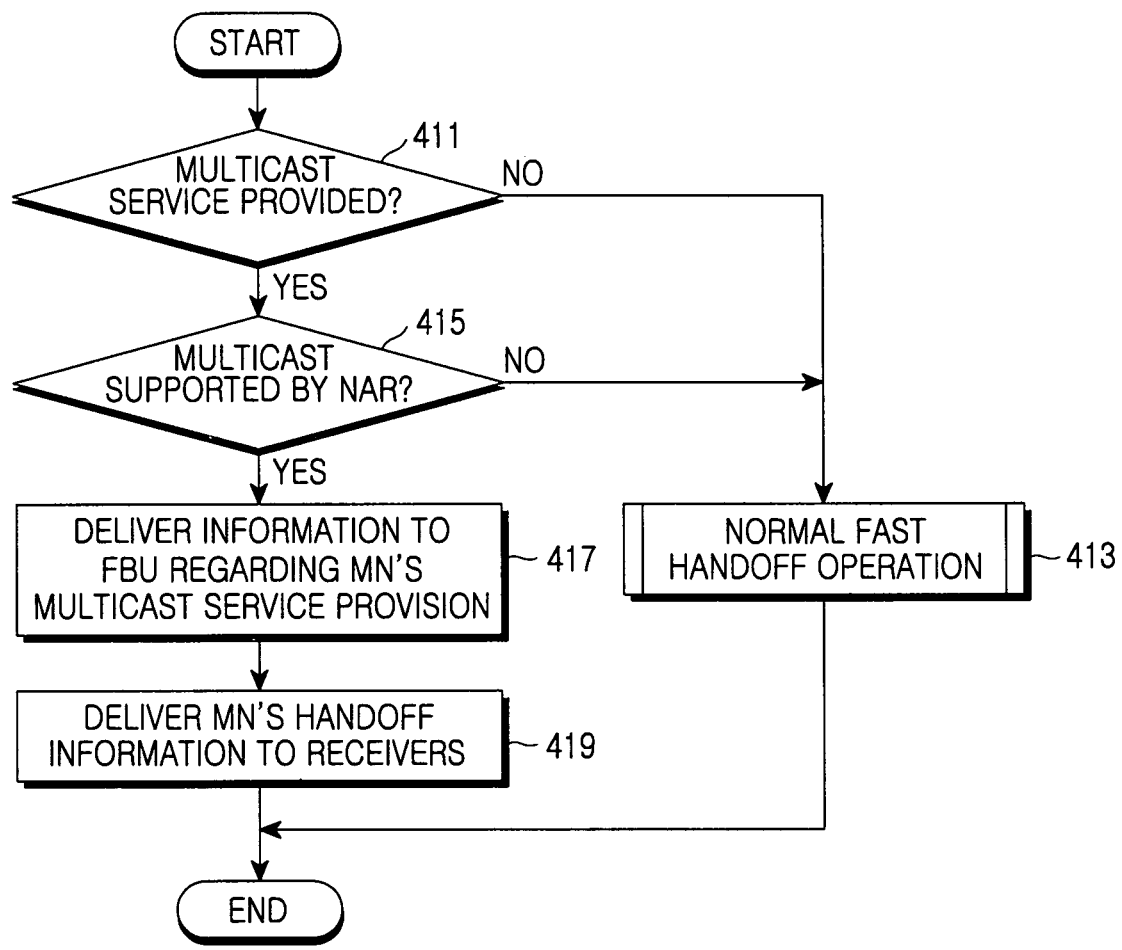
FIG. 4 is a flowchart showing operation of an MN 300 shown in FIG. 3.

FIG. 4 is a flowchart showing the operation of the MN 300 shown in FIG. 3. Referring to FIG. 4, the MN 300 checks whether the MN 300 is providing a multicast service in step 411. When it is confirmed after the check that the MN 300 is not providing any multicast service, it proceeds to step 413. In step 413, the MN 300 performs normal fast handoff operation and ends it, since the MN 300 provides no multicast service.

When it is confirmed after the check in step 411 that the MN 300 is providing a multicast service, the MN 300 proceeds to step 415. In step 415, the MN 300 checks whether or not the NAR 370, to which it is about to hand off, can provide the multicast service that is currently provided by the MN 300 as a source node. The check result of whether or not the NAR 370 can provide the multicast service which is provided by the MN 300 as a source node is known via the "M" field of the PrRtAdv message. When it is confirmed after the check that the NAR 370 cannot provide the multicast service which is provided by the MN 300 as a source node, the MN 300 proceeds to step 413.

When it is confirmed after the check in step 415 that the NAR 370 can provide the multicast service which is provided by the MN 300 as a source node, the MN 300 proceeds to step 417. In step 417, the MN 300 adds information on the multicast service which is provided by the MN 300 to the FBU message and transmits it to the NAR 370. Thereafter, the MN 300 proceeds to step 419. In step 419, when the PAR 340 receives a HAck message from the NAR 370, it transmits the NCoA of the MN 300 included in the HAck message to receivers, which are provided with the multicast service from the MN 300, so that they are notified that the MN 300 has handed off from the PAR 340 to the NAR 370. The notification of handoff of the MN 300 is performed in one of two schemes, depending on whether the MN 300 is disconnected from the PAR 340, as described with reference to FIG. 3, and repeated description thereof will be omitted herein.

The operation of the MN 300 shown in FIG. 3 has been described with reference to FIG. 4.

Figure 5:
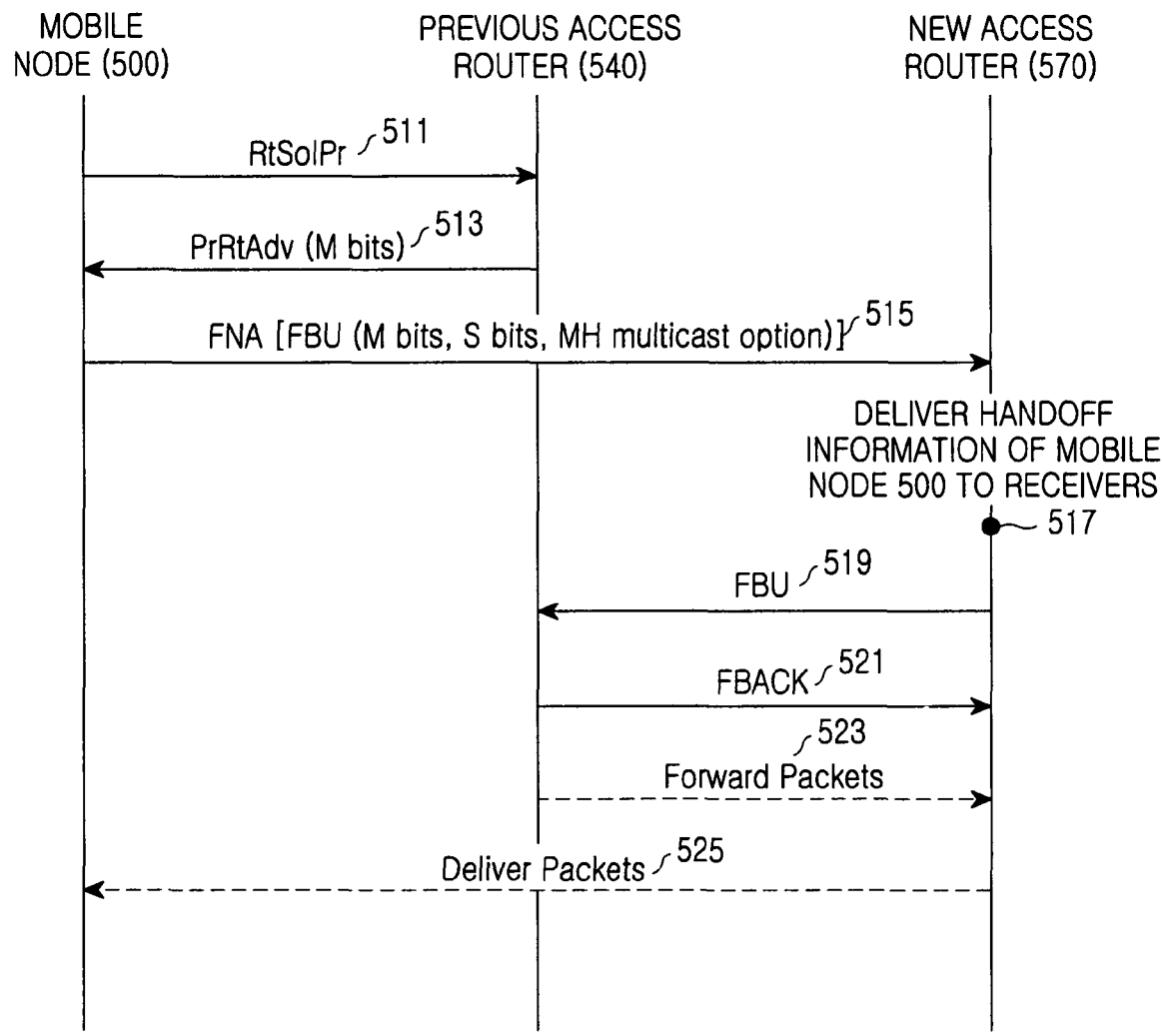
FIG. 5 shows the flow of signals in a process for providing a multicast service according to handoff of an MN, which provides a multicast service in a mobile IP communication system according to a second embodiment of the present invention.

FIG. 5 shows the flow of signals in a process for providing a multicast service according to handoff of an MN, which provides a multicast service in a mobile IP communication system according to a second embodiment of the present invention (i.e. which uses a reactive fast handoff scheme).

Prior to the description of FIG. 5, it is to be noted that the process for providing a multicast service according to handoff of an MN, which provides a multicast service in a mobile IP communication system according to a second embodiment of the present invention, has the same steps as those of a conventional process for providing a multicast service according to fast handoff in a reactive fast handoff scheme, except that, when a FBU message (which is created by encapsulating a FNA message) is transmitted, a multicast service option of a mobility header is used to transmit multicast information.

Referring to FIG. 5, an MN 500, which is a source node for providing a multicast service, transmits an RtSolPr message, which solicits information for fast handoff, to a PAR 540 (step 511). Upon receiving the RtSolPr message from the MN 500, the PAR 540 transmits a PrRtAdv message including information on an NAR 570, to which the MN 500 is about to hand off (i.e. information on whether or not the NAR 570 can provide the multicast service), to the MN 500 (step 513). As described with reference to Table 1, the PrRtAdv message uses an M field, which is newly proposed by the present invention, to indicate whether or not the NAR 570 can provide the multicast service.

After receiving the PrRtAdv message from the PAR 540, the MN 500 is disconnected from the PAR 540. When the MN 500 fails to receive an FBack message from the PAR 540, i.e., when the MN 500 has not transmitted an FBU message to the PAR 540 and cannot receive an FBack message from it, or when the MN 500 has transmitted an FBU message to the PAR 540 but is disconnected from it before receiving an FBack message, the MN 500 transmits an FNA message, which is created by encapsulating the FBU message, to the NAR 570 (step 515). The FBU message has already been described with reference to Table 2, and repeated description thereof will be omitted for sake of clarity.

The transmission of the FNA message is performed to confirm whether an NCoA, which is newly created by the MN 500, can be used by the NAR 570. When the NCoA newly created by the MN 500 has already been allocated to and used by the NAR 570, the NAR 570 must delete packet data of the FBU message and transmit another NCoA, which is to be used by the MN 500, via a router advertisement (RA) after setting a neighbor advertisement acknowledgement (NAACK) option.

After receiving the FNA message from the MN 500, the NAR 570 notifies receivers, which are provided with a multicast service from the MN 500, that the MN 500 has handed off from the PAR 540 to the NAR 570. In this case, the NAR 570 transmits packet data using the PCoA of the MN 500 as a source address, the multicast service IP address as a reception address, and the NCoA as data. Particularly, the packet data, namely information about NCoA of the MN, is encapsulated and transmitted to the PAR 540 using the NAR 570 as a transmitter and the PAR 540 as a receiver. Upon receiving the packet data, namely information about NCoA of the MN, the PAR 540 de-encapsulates it and transmits it to final receivers, i.e. receivers which are provided with the multicast service from the MN 500 (step 517). The NAR 570 notifies the receivers of the handoff of the MN 500 and transmits an FBU message to the PAR 540 (step 519). As mentioned above, the FBU message notifies that data must be transmitted to the NAR 570, because the MN 500 is connected to the NAR 570. Particularly, the FBU message authorizes the PAR 540 to bind the PCOA and NCOA of the MN 500, so that data can tunnel into the NAR 570 (i.e. region into which the MN 500 has moved).

After receiving the FBU message from the NAR 570, the PAR 540 transmits an FBACK message, which is an acknowledgement message to the FBU message, to the NAR 570 (step 521). The PAR 540 transmits normal data, which is received by the MN 500, to the NAR 570 (step 523). The NAR 570 transmits the normal data, which is forwarded from the PAR 540, to the MN 500 (step 525). In the case of steps 523 and 525, the MN 500 acts as a normal receiver, not a source node for providing a multicast service.

The operation for providing a multicast service according to handoff of an MN, which provides a multicast service in a mobile IP communication system according to the second embodiment of the present invention, has been described with reference to FIG. 5.

Figure 6:
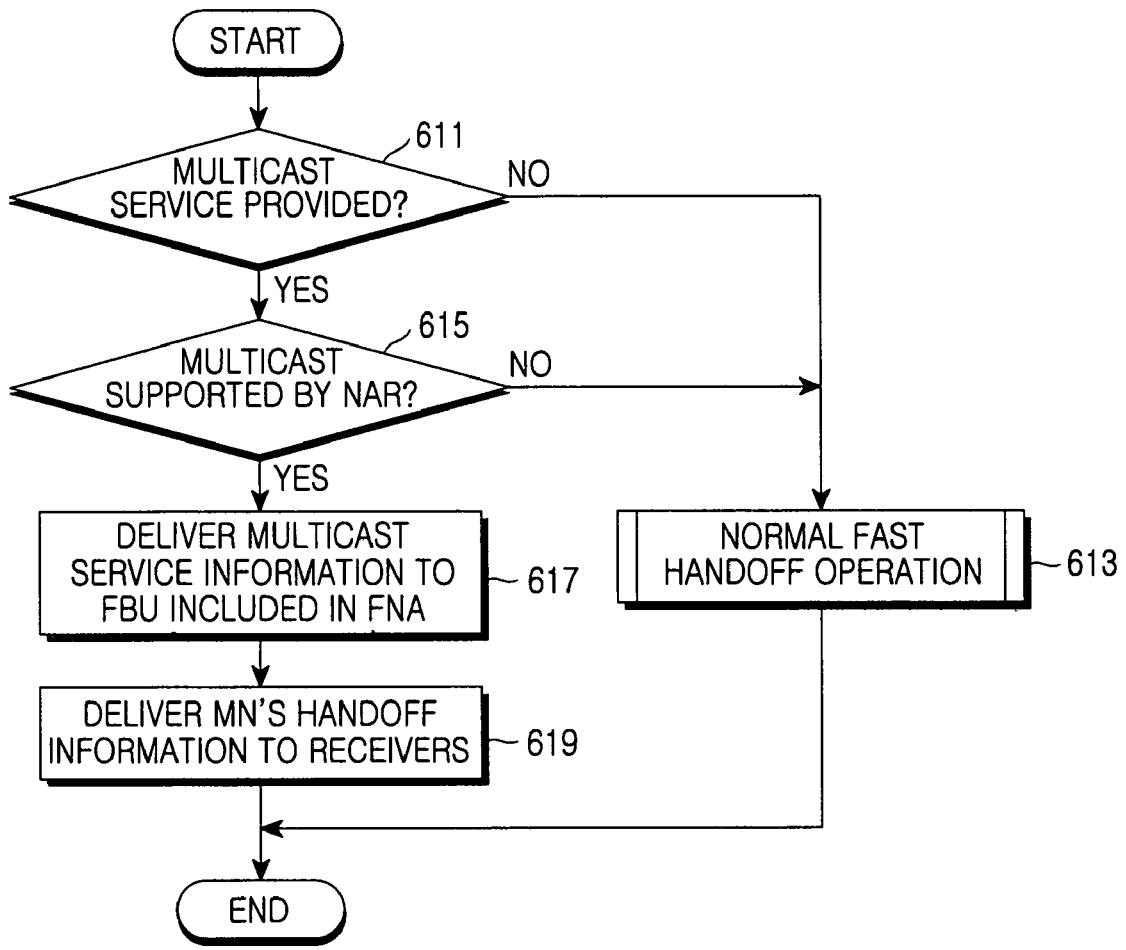
FIG. 6 is a flowchart showing operation of an MN 500 shown in FIG. 5.

FIG. 6 is a flowchart showing operation of the MN 500 shown in FIG. 5.

Referring to FIG. 6, the MN 500 checks whether the MN 500 is providing a multicast service in step 611. When it is confirmed after the check that the MN 500 is not providing any multicast service, it proceeds to step 613. In step 613, the MN 500 performs normal fast handoff operation and ends it, since the MN 500 provides no multicast service.

When it is confirmed after the check in step 611 that the MN 500 is providing a multicast service, the MN 500 proceeds to step 615. In step 615, the MN 500 checks whether or not the NAR 570, to which it is about to hand off, can provide the multicast service that is currently provided by the MN 500 as a source node. The check result of whether the NAR 570 can provide the multicast service which is provided by the MN 500 as a source node is known via the "M" field of the PrRtAdv message. When it is confirmed after the check that the NAR 570 cannot provide the multicast service which is provided by the MN 500 as a source node, the MN 500 proceeds to step 613.

When it is confirmed after the check in step 615 that the NAR 570 can provide the multicast service which is provided by the MN 500 as a source node, the MN 500 proceeds to step 617. In step 617, the MN 500 transmits information on the FNA message, which is created by encapsulating the FBU message, to the NAR 570 and notifies information on the multicast service provided by the MN 500. Thereafter, the MN 500 proceeds to step 619. In step 619, the NAR 570 transmits the NCOA of the MN 500, which is included in the FBU message within the FNA message, to receivers, which are provided with the multicast service from the MN 500, so that they are notified that the MN 500 hands off from the PAR 540 to the NAR 570.

The present invention is advantageous in that when a source node for providing a multicast service in a mobile IP communication system hands off, a tree is reconstructed at high speed to provide the multicast service. This minimizes time delay caused by handoff of the source node and tree reconstruction. As a result, multicast service data loss is minimized. Accordingly, overall performance and service quality of the mobile IP communication system improves.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for providing a multicast service when a Mobile Node (MN) performs handoff from a first Access Router (AR) to a second AR in a mobile Internet Protocol (IP) communication system including the first AR and second AR, the MN being a source node for providing the multicast service to a number of receivers and currently performing communication with the first AR, the second AR being different from the first AR, the method comprising the steps of:

sending a request for information for fast handoff from the MN to the first AR;

sending a notification from the first AR to the MN indicating whether the second AR can provide the multicast service in response to the fast handoff information request;

sending a notification from the MN to the first AR indicating that the second AR must transmit subsequently-occurring multicast service data, after the MN is notified whether the second AR can provide the multicast service;

sending a notification from the first AR to the second AR indicating handoff initiation of the MN when the first AR is notified that the second AR must transmit subsequently-occurring multicast service data;

sending a notification from the second AR to the first AR indicating handoff initiation notification acknowledgement, after the second AR is notified of the handoff initiation;

sending a notification from the first AR to the receivers indicating that the MN has performed handoff from the first AR to the second AR, when the first AR is notified of the handoff initiation notification acknowledgement so that the receivers are controlled to join a new multicast tree to be provided with the multicast service;

sending a notification from the first AR to the receivers indicating that the second AR will transmit the multicast service data to the MN and the second AR, after the first AR notifies the receivers of the handoff of the MN;

delivering normal data from the first AR to the second AR after the first AR notifies the second AR that the second AR will transmit the multicast service data, the normal data including reception multicast other than the multicast service data received at the MN as a target;

sending a notification from the MN to the second AR indicating that the MN has been disconnected from the first AR and connected to the second AR, after the MN is notified that the second AR will transmit the multicast service data; and forwarding the normal data from the second AR to the MN when the second AR is notified by the MN that the MN has been connected to the second AR.

2. The method as claimed in claim 1, further comprising a step of transmitting the multicast service data from the MN to the receivers when the first AR notifies the receivers of the handoff of the MN so that the receivers are controlled to receive the multicast service data via the reconstructed tree.

3. The method as claimed in claim 1, wherein, in the step of sending a notification from the MN to the first AR indicating that the second AR must transmit subsequently-occurring multicast service data, the first AR is notified that the second AR must transmit subsequently-occurring multicast service data together with information indicating that the MN is the source node for providing the multicast service and multicast service information on the multicast service.

4. The method as claimed in claim 3, wherein the multicast service information includes a multicast service IP address of the multicast service.

5. The method as claimed in claim 1, wherein, in the step of sending the notification from the first AR to the second AR indicating handoff initiation of the MN, the second AR is notified of the handoff initiation of the MN together with information indicating that the MN is the source node for providing the multicast service and multicast service information on the multicast service.

6. The method as claimed in claim 5, wherein the multicast service information includes a multicast service IP address of the multicast service.

7. The method as claimed in claim 6, further comprising the steps of:

detecting disconnection of the MN from the first AR at the second AR after the second AR is notified of the handoff initiation of the MN;

setting a previous care-of address of the MN as a source IP address and the multicast service IP address as a destination IP address at the second AR after the second AR detects disconnection of the MN from the first AR, creating packet data having a new care-of address of the MN set as data, encapsulating the packet data with the second AR as a transmitter of the packet data and the first AR as a receiver of the packet data and transmitting the packet data to the first AR; and receiving the packet data from the second AR at the first AR, de-encapsulating the packet data and transmitting the new care-of address of the MN to the receivers to notify that the MN has performed handoff from the first AR to the second AR.

8. The method as claimed in claim 5, wherein, in the step of sending the notification from the second AR to the first AR indicating handoff initiation notification acknowledgement, the first AR is notified of the handoff initiation notification acknowledgement together with information regarding whether a multicast service corresponding to the multicast service information can be provided.

9. The method as claimed in claim 8, wherein the multicast service information includes a multicast service IP address of the multicast service.

10. The method as claimed in claim 9, wherein, in the step of sending the notification to the receivers indicating that the MN has performed handoff from the first AR to the second AR, an IP address of the first AR is set as a destination IP address and a new case of address of the MN is set as the multicast service IP address to notify the receivers of the handoff of the MN.

11. The method as claimed in claim 1, wherein, in the step of sending the notification to the second AR that the MN has been disconnected from the first AR and connected to the second AR, the second AR is notified of disconnection of the MN together with multicast service information on the multicast service.

12. The method as claimed in claim 11, wherein the multicast service information includes a multicast service IP address of the multicast service.

13. A method for providing a multicast service when an MN performs handoff from a first AR to a second AR in a mobile IP communication system including the first AR and second AR, the MN being a source node for providing the multicast service to a number of receivers and currently performing communication with the first AR, the second AR being different from the first AR, the method comprising the steps of:

sending a request for information for fast handoff to the first AR when recognizing that handoff from the first AR to the second AR is necessary;

receiving notification of whether the second AR can provide the multicast service from the first AR after requesting the information for fast handoff;

sending a notification to the first AR indicating that the second AR must transmit subsequently-occurring multicast service data, after receiving the notification indicating whether the second AR can provide the multicast service;

sending a notification from the second AR to the first AR indicating transmission of the second AR, after notifying the first AR that the second AR must transmit subsequently-occurring multicast service data;

sending a notification to the receivers indicating that the MN has performed handoff from the first AR to the second AR after notifying the first AR of transmission of the second AR, and transmitting the multicast service data from the MN to the receivers so that the receivers are controlled to receive the multicast service data via a new multicast tree re-joined by the receivers;

sending a notification from the first AR to the receivers indicating that the second AR will transmit the multicast service data to the MN and the second AR, after the first AR notifies the receivers of the handoff of the MN;

delivering normal data from the first AR to the second AR after the first AR notifies the second AR that the second AR will transmit the multicast service data, the normal data including reception multicast other than the multicast service data received at the MN as a target;

sending a notification from the MN to the second AR indicating that the MN has been disconnected from the first AR and connected to the second AR, after the MN is notified that the second AR will transmit the multicast service data; and forwarding the normal data from the second AR to the MN when the second AR is notified by the MN that the MN has been connected to the second AR.

14. The method as claimed in claim 13, further comprising the steps of:

receiving notification that the second AR will transmit the multicast service data from the first AR, after notifying the first AR that the second AR must transmit subsequently-occurring multicast service data;

sending a notification of disconnection from the first AR and completion of connection to the second AR, after receiving notification that the second AR will transmit the multicast service data; and receiving delivery of normal received data from the second AR after notifying of completion of connection to the second AR, the normal received data including received multicast data, unicast data, or any-cast data other than the transmitted multicast service data.

15. The method as claimed in claim 14, wherein, in the step of sending the notification to the first AR that the second AR must transmit subsequently-occurring multicast service data, the first AR is notified that the second AR must transmit subsequently-occurring multicast service data together with information indicating that the MN is the source node for providing the multicast service and multicast service information on the multicast service.

16. The method as claimed in claim 14, wherein the multicast service information includes a multicast service IP address of the multicast service.

17. The method as claimed in claim 14, wherein, in the step of sending the notification of disconnection from the first AR and completion of connection to the second AR, connection to the second AR is notified together with multicast service information on the multicast service.

18. The method as claimed in claim 17, wherein the multicast service information includes a multicast service IP address of the multicast service.

19. A method for providing a multicast service when an MN performs handoff from a first AR to a second AR in a mobile IP communication system including the first AR and second AR, the MN being a source node for providing the multicast service to a number of receivers and currently performing communication with the first AR, the second AR being different from the first AR, the method comprising the steps of:

sending a request for information for fast handoff from the MN to the first AR;

sending a notification from the first AR to the MN indicating whether the second AR can provide the multicast service in response to the fast handoff information request;

disconnecting the MN from the first AR and setting up connection of the MN to the second AR, after the MN is notified whether the second AR can provide the multicast service;

sending a notification from the MN to the second AR indicating that the MN has been disconnected from the first AR and connected to the second AR together with information indicating that the second AR must transmit subsequently-occurring multicast service data to the first AR, after setting up connection of the MN to the second AR;

sending a notification from second AR to the receivers that the MN has performed handoff from the first AR to the second AR, after the second AR is notified that the MN has been connected to the second AR, so that the receivers are controlled to reconstruct a tree to be provided with the multicast service; and transmitting the multicast service data from the MN to the receivers when the second AR notifies the receivers that the MN has performed handoff from the first AR to the second AR so that the receivers are controlled to receive the multicast service data via the reconstructed tree;

wherein the notification indicating that the second AR must transmit subsequently-occurring multicast service data to the first AR includes information indicating that the MN is the source node for providing the multicast service and multicast service information on the multicast service.

20. The method as claimed in claim 19, further comprising the steps of:

sending a notification from the second AR to the first AR indicating that the second AR must transmit subsequently-occurring multicast service data, after the second AR notifies the receivers that the MN has performed handoff from the first AR to the second AR;

sending a notification from the first AR to the second AR indicating that the second AR will transmit the multicast service data after the first AR is notified that the second AR must transmit subsequently-occurring multicast service data;

delivering normal data from the first AR to the second AR, after the first AR notifies the second AR that the second AR will transmit the multicast service data, the normal data including reception multicast other than the multicast service data received at the MN as a target; and forwarding the normal data from the second AR to the MN.

21. The method as claimed in claim 20, wherein, in the step of sending the notification from the second AR to the first AR indicating that the second AR must transmit subsequently-occurring multicast service data, the first AR is notified that the second AR must transmit subsequently-occurring multicast service data together with information indicating that the MN is the source node for providing the multicast service and multicast service information on the multicast service.

22. The method as claimed in claim 21, wherein the multicast service information includes a multicast service IP address of the multicast service.

23. The method as claimed in claim 19, wherein the multicast service information includes a multicast service IP address of the multicast service.

24. The method as claimed in claim 23, wherein the step of sending the notification from the second AR to the receivers indicating that the MN has performed handoff from the first AR to the second AR comprises:

setting a previous care-of address of the MN as a source IP address, the multicast service IP address as a destination IP address and a new care-of address of the MN as data to create packet data, encapsulating the packet data with the second AR as a transmitter of the packet data and the first AR as a receiver of the packet data, and transmitting the packet data to the first AR; and receiving the packet data from the second AR at the first AR, de-encapsulating the received packet data and transmitting the new care-of address of the MN to the receivers to notify that the MN has performed handoff from the first AR to the second AR.

25. A method for providing a multicast service when an MN performs handoff from a first AR to a second AR in a mobile IP communication system including the first AR and second AR, the MN being a source node for providing the multicast service to a number of receivers and currently performing communication with the first AR, the second AR being different from the first AR, the method comprising the steps of:

sending a request for information for fast handoff to the first AR when recognizing that handoff from the first AR to the second AR is necessary;

receiving a notification indicating whether the second AR can provide the multicast service from the first AR after requesting the fast handoff information;

performing disconnection from the first AR and setup of connection to the second AR after receiving notification of whether the second AR can provide the multicast service, and notifying the second AR of disconnection from the first AR and completion of connection to the second AR together with information indicating that the second AR must transmit subsequently-occurring multicast service data to the first AR;

sending a notification from the second AR to the receivers indicating that the MN has performed handoff from the first AR to the second AR after being notified that the MN has been connected to the second AR, and transmitting the multicast service data to the receivers so that the receivers are controlled to receive the multicast service data via a new multicast tree rejoined by the receivers; and transmitting the multicast service data from the MN to the receivers when the second AR notifies the receivers that the MN has performed handoff from the first AR to the second AR so that the receivers are controlled to receive the multicast service data via the reconstructed tree;

wherein the notification indicating that the second AR must transmit subsequently-occurring multicast service data to the first AR includes information indicating that the MN is the source node for providing the multicast service and multicast service information on the multicast service.

26. The method as claimed in claim 25, wherein the information indicating that the second AR must transmit subsequently-occurring multicast service data to the first AR includes information indicating that the MN is the source node for providing the multicast service and multicast service information on the multicast service.

27. The method as claimed in claim 26, wherein the multicast service information includes a multicast service IP address of the multicast service.

* * * * *